United States Patent

Mori et al.

[11] Patent Number: 5,766,703
[45] Date of Patent: Jun. 16, 1998

[54] AUTOMOBILE WEATHER STRIP

[75] Inventors: Etsuro Mori, Kasugai; Hiroyasu Kozawa, Ichinomiya; Toshiyuki Tanaka, Aichi-ken; Seiji Ito, Tsushima, all of Japan

[73] Assignee: Toyoda Gosei Co., Ltd., Aichi-ken, Japan

[21] Appl. No.: 576,208

[22] Filed: Dec. 21, 1995

[30] Foreign Application Priority Data

Dec. 27, 1994 [JP] Japan .................. 6-325468
Dec. 27, 1994 [JP] Japan .................. 6-325494
May 17, 1995 [JP] Japan .................. 7-118746

[51] Int. Cl.$^6$ .................. B60J 10/02; B32B 25/14
[52] U.S. Cl. .................. 428/31; 428/308.4; 428/319.9; 428/519; 428/520; 428/521; 428/523; 428/355 BL; 296/93; 296/207
[58] Field of Search .................. 428/31, 304.4, 428/521, 517, 522, 355 BL; 296/93, 207, 201, 308.4, 318.4, 319.3, 315.5, 315.9

[56] References Cited

U.S. PATENT DOCUMENTS 5,093,426  3/1992  Sakabe et al. .................. 525/223
5,123,988  6/1992  Iwasa .................. 156/244.11
5,143,772  9/1992  Iwasa .................. 428/122

*Primary Examiner*—Paul J. Thibodeau
*Assistant Examiner*—D. Lawrence Tarazano
*Attorney, Agent, or Firm*—Cushman Darby & Cushman, IP Group of Pillsbury Madison & Sutro LLP

[57] ABSTRACT

An automobile weather strip having a main body made of a sulfur-vulcanizable ethylene propylene rubber (EPDM) type compound and having a portion designed to be in contact with a sealer when the weather strip is mounted to an automobile. A sealer underlying layer is included that will be in contact with the sealer with that layer comprised of a bondability improving EPDM type compound and coextruded together with the main body. The bondability improving EPDM type compound is based on a blended polymer having a blending ratio:

| EPDM type polymer | 60–96 wt % |
| NBR type polymer | 2–30 wt % |
| hydrogenated SBR type polymer | 2–30 wt %. |

A practical bondability can be ensured between the weather strip and the sealer with no pretreatment, such as by buff fabrication, to a portion of the weather strip to be abutted to or in contact with the sealer.

8 Claims, 2 Drawing Sheets

AUTOMOBILE WEATHER STRIP

Japanese Application Nos. 6-325468 and 6-325494, filed Dec. 27, 1994, and Japanese Application No. 7-118746, filed May 17, 1995, are incorporated herewith by reference.

BACKGROUND OF THE INVENTION

1. Field of the Invention

The present invention concerns automobile weather strips made of an EPDM blended compound, a portion of which is in contact with a sealer when mounted to an automobile.

2. Description of Related Art

A list of abbreviations for polymers and plasticizers used in the present specification is as follows:

NBR—unsaturated nitrile-conjugated diene copolymer rubber

EPDM—sulfur-vulcanizable ternary ethylene-propylene rubber

SBR—styrene-conjugated diene copolymer rubber,

DOP—dioctyl phthalate.

FIG. 1 is a cross-sectional view of a window frame rubber, for example, but it should be understood that the present invention is not particularly restricted only to window frame weather strips.

Bonding and sealing between a window frame rubber W, a glass window and a car body are usually accomplished by using a sealer. In such instances, the window frame rubber is usually made of an extrusion molding material, such as a sulfur vulcanizable ternary EPDM compound.

Bondability between the EPDM and the sealer is frequently insufficient. This is because the EPDM is a typical non-polar rubber, while the sealer is a polar high polymer, such as a polyurethane type, for ensuring close bondability with glass or metal.

Therefore, portions of the window frame rubber that will be in contact with the sealer after extrusion, that is, a glass holding groove bottom or a seal lip forming portion, are pretreated after extrusion, for example, by buffing, degreasing and primer coating in order to improve the bondability.

Since the portion in contact with the sealer may have an uneven surface, such as the glass holding groove bottom or lip portion as described above, it is difficult to apply mechanical buffing to some areas and requires such work to be done by a manual operation, thus increasing the number of production steps. Further, the primer coating is essential to reducing costs.

Automobile manufacturers have demanded that weight for automobiles be reduced more in recent years for environmental purposes and to improve or lower fuel costs. To lessen weight has also required reducing the weight of weather strips. Also, it is desirable that excellent bondability be obtained between the weather strip and the sealer.

SUMMARY OF THE INVENTION

In view of the foregoing, it is an object of the present invention to provide an automobile weather strip capable of ensuring practical bondability between a strip and a sealer without applying pretreatment, such as buffing or primer coating, to those portions of the strip that will be in contact with the sealer after extrusion.

The foregoing objective can be obtained in accordance with a first embodiment of the present invention for automobile weather stripping having a main body made of a sulfur vulcanizable common EPDM type compound and another portion in contact with a sealer when mounted to an automobile.

The weather strip also includes a sealer portion, or an underlying layer, that will be in contact with the sealer layer, made of an EPDM type compound for improving bondability. This sealer portion is formed by coextrusion together with the main body.

The EPDM compound for improving bondability is based on a blend polymer having a blending ratio:

| EPDM type polymer | 60–96 wt % |
| --- | --- |
| NBR type polymer | 2–30 wt % |
| Hydrogenated SBR type polymer | 2–30 wt % |

Another objective of the present invention is to provide an automobile weather strip capable of producing a sufficient bond between that weather strip and a sealer, even if the strip main body is made of micro-cell foam, and is capable of meeting the demand for reduced weight of the weather strip.

The foregoing objective can be obtained in accordance with a second embodiment of the present invention of a weather strip made of a sulfur vulcanizable micro-cell foam EPDM type compound and a sealing portion in contact with a sealer when mounted to an automobile.

The sealing portion includes an underlying sealer layer, that will be in contact with the sealer, made of an EPDM type compound that will improve the bondability. That underlying layer can be formed by coextrusion together with the main body. The EPDM type compound for improving bondability is based on a blend of polymer having a blending ratio:

| EPDM type polymer | 60–96 wt % |
| --- | --- |
| NBR type polymer | 2–30 wt % |
| Hydrogenated SBR type polymer | 2–30 wt % |

The former objective can also be obtained in accordance with a third embodiment of the present invention by a weather strip, for use in an automobile, made of a sulfur vulcanizable EPDM type compound and having a portion for contacting a sealer when mounted to an automobile.

The EPDM type compound is based on a blend polymer having a blending ratio:

| EPDM type polymer | 40–98 wt % |
| --- | --- |
| NBR type polymer | 2–60 wt % |
| SBR type polymer | 0–30 wt % |

DESCRIPTION OF THE PREFERRED EMBODIMENTS

In the subsequent descriptions, the blending unit and the compositional ratio are each based on the unit of weight unless otherwise specified.

The first and second embodiments of the present inventions.

Figure 1:
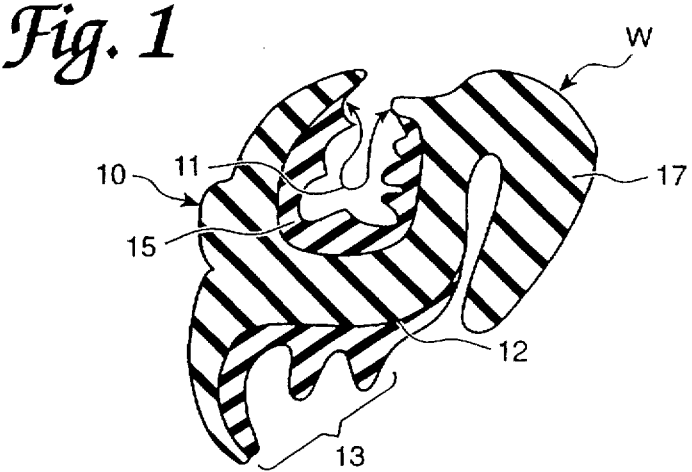
FIG. 1 is a cross-sectional view illustrating a first embodiment of a window frame weather strip according to the present invention.
Figure 2:
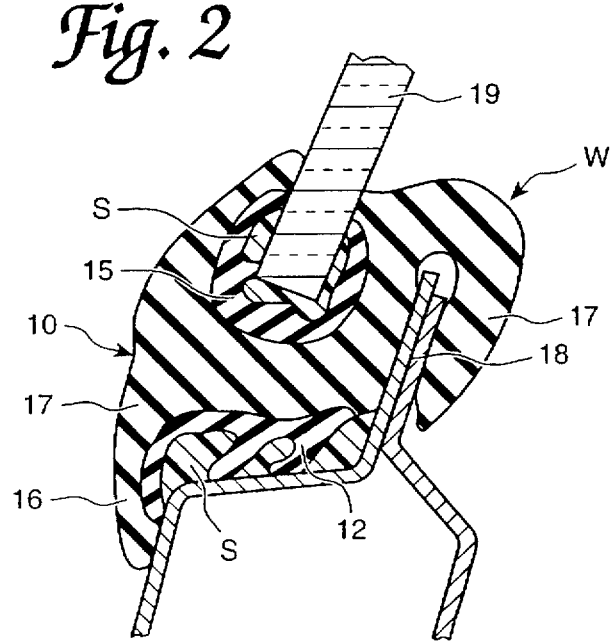
FIG. 2 is a cross-sectional view of the window frame weather strip shown in FIG. 1 mounted to an automobile.

As shown in FIG. 1, an automobile weather strip according to the present invention, generally indicated at W, comprises a main body 10 made of a sulfur-vulcanizable general-purpose EPDM compound. The main body includes a glass holding portion 11 designed to be in contact with a sealer upon mounting to an automobile. As shown in FIG. 2, portion 11 comprises a glass hold groove. Another portion of body 10 that will be contact with a sealer is the seal lip forming portion 13.

Sealer underlying layers 15 and 12 made of a bondability improving EPDM compound are formed together with the main body 10 by coextrusion with the portions 11, 13 that will be in contact with the sealer. Such coextrusion is usually carried out by connecting the extruder for the window frame rubber main body and an extruder for the adhesive layer with a multi-component extrusion head with vulcanization being carried out following the coextrusion. A microwave heating device and a hot blow vulcanizing device can be used, for example, as the way to accomplish vulcanization. Vulcanizing is usually undertaken at temperatures of about 200° C.×3 for a period of about ten minutes.

EPDM is produced by adding a small amount of a non-conjugated diene, such as ethylidene norbornene, cyclopentadiene and 1,4-hexadiene as a third ingredient to ethylene and propylene, and copolymerizing them to introduce double bonds on the side chains for making them sulfur vulcanizable.

The polymer is usually compounded with auxiliary materials such as reinforcing fillers (carbon black or white carbon), plasticizers, lubricants and vulcanizing chemicals.

Figure 3:
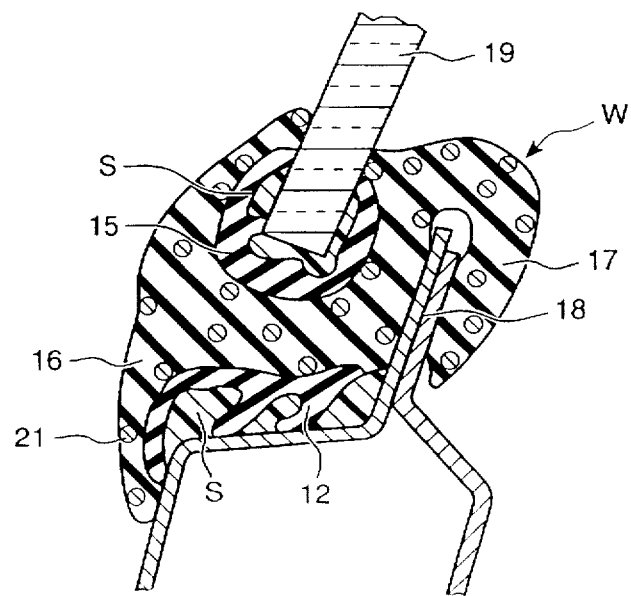
FIG. 3 is a cross-sectional view showing a second embodiment of a window frame weather strip.

Employing small-cell foam compound instead of the common EPDM compound will enable the resulting weather strip to easily meet the demand for lighter weight weather strip. Such a foam weather strip is shown in FIG. 3.

There is no particular restrictions for the embodiments of slight foaming, but the use of the EPDM compound of slight foaming formulation described in Japanese Laid-Open Hei 6-183305 is desired.

That is, the EPDM compound of micro-cell foam formulation is prepared by dispersing microcapsules 21 therein and the microcapsule 21 is a heat expansible capsule containing a low boiling hydrocarbon that will expand at vulcanization temperatures. Specifically, products marketed from Matsumoto Yushi Seiyaku Co. under the trade name of "MATSUMOTO MICRO SPHERE F-80VSD" can be employed. The heat expansible capsule is made of an acrylonitrile copolymer (softening point: 145°–150° C.), and a capsule of 5 to 8 μm with no destruction of shell walls upon expansion of the contained low boiling hydrocarbon at vulcanization temperatures. The blending amount of the heat expansible capsule is usually from 3 to 20 parts based on 100 parts of the rubber polymer (EPDM).

A specified blend polymer, as described below, can be used as the bondability improving EPDM compound.

The blend polymer used has a blending ratio of:

| | |
|---|---|
| EPDM type polymer | 60–95% (preferably: 70–90%) |
| NBR type polymer | 2–30% (preferably: 5–20%) |
| Hydrogenated SBR type polymer | 2–30% (preferably: 5–20%) |

If the EPDM type polymer is less than 60%, it is difficult to ensure vulcanization bondability between the sealer underlying layer and the main body, whereas if it exceeds 96%, it is difficult to ensure the bondability between the sealer underlying layer and the sealer. Further, if the NBR type polymer is less than 2%, it is difficult to ensure bondability between the sealer underlying layer and the sealer, whereas if it exceeds 30%, it is difficult to ensure the vulcanization bondability between the sealer underlying layer and the main body.

If the hydrogenated SBR type polymer is less than 2%, it is difficult to ensure the vulcanization bondability between the sealer underlying layer and the main body, whereas if it exceeds 30%, it is difficult to ensure the bondability between the sealer underlying layer and the sealer.

The same polymer as is used for the main body can be used as the EPDM type polymer.

The NBR type polymer referenced above may be a general-purpose polymer, but a modified NBR type polymer which is an amorphous unsaturated nitrile-conjugated diene-acrylic acid ester ternary copolymer can also be used.

As the unsaturated nitrile, there can be mentioned, for example, acrylonitrile and methacrylonitrile. The conjugated diene can include, for example, butadiene and isoprene. The acrylic ester can include, for example, ethyl acrylate, n-propyl acrylate, isopropyl acrylate, n-butyl acrylate, isobutyl acrylate, n-pentyl acrylate, and isopentyl acrylate (preferably alkyl alcohol ester of 2 to 5 carbon atoms.

Particularly, acrylonitrile-butadiene-n-butyl acrylate is preferred. The monomer composition usually comprises 10 to 40% of acrylonitrile; 20 to 50% of butadiene; and 25 to 55% of n-butyl acrylate.

The hydrogenated SBR type polymer is formed by hydrogenating a styrene and conjugated diene copolymer.

Hydrogenation increases covulcanizability with the NBR type polymer vulcanized rubber and the EPDM type polymer vulcanized rubber, thus increasing bondability between the sealer underlying layer and the main body rubber, as well as also increasing the bondability to the sealer.

The hydrogenation rate is usually from 90 to 100% and, preferably, from 95 to 100%.

The polymer composition of the SBR type polymer before hydrogenation comprises 10 to 40% (preferably 20 to 30%) of styrene content, and 60 to 100% (preferably 70 to 80%) of conjugated diene content. As the conjugated dienes, those mentioned previously for the NBR type polymer can be used.

Assuming the styrene polymer as A, the styrene-butadiene random copolymer or butadiene polymer having many vinyl bonds as B and the butadiene polymer having many cis-1,4 bonds as C, the conjugated diene rubber includes types such as AB, ABA and ABC, with ABA being particularly preferred.

The blend polymer is usually blended with auxiliary materials such as, for example, reinforcing fillers (carbon black or white carbon), plasticizers, lubricants, vulcanization chemicals and, optionally, coloring agent, kneaded in a general-purpose kneader such as roll and Banbury mixer and formed into a rubber blend for an underlying layer.

Table 2 shows blending formulation for carbon black blend system.

The thickness of the sealer underlying layer 15 is preferably 0.5 to 2 mm. If it is less than 0.5 mm, it is difficult to obtain practical strength making it difficult to attain the aimed effect of the sealer underlying layer 15 and, on the other hand, if it exceeds 2 mm it increases material cost.

Weather stripping W thus having the sealer underlying layer 15 is mounted to an automobile as shown in FIG. 2 in the same manner as usual by disposing sealer S to portions to be in contact with the sealer, that is, the glass holding groove 11 and a seal lip portion 13. In the drawing, reference numerals 16 and 17 represent seal lips, 18 is an automobile body flange and 19 represents window shield glass.

In this case, since the sealer underlying layers 12 and 15 are formed along those portions designed to be in contact with the sealer, a sufficient bonding strength can be expected between such portions and the sealer S, so that practical bonding strength (1.5 kgf/10 mm) can be obtained even without pretreatment, such as buffing, degreasing or primer coating.

In those instances when primer coating is applied, a greater bonding strength can be obtained between the sealer underlying layer and the sealer. If a primer for EPDM is precoated before coating the general-purpose primer (socyanate type primer in case of urethane sealer), a maximum bonding strength providing 100% adherend destruction (sealer destruction) can be obtained.

It is preferred to use an isocyanate type primer such as "9002T" (manufactured by Sunstar Giken Co.) for the sealer primer, and "K500" (manufactured by Sumitomo Three M Co.) and a two-packed type: "SL8861" (manufactured by Sakai Kagaku Co.), "DISMODULE RFE" (manufactured by Bayer Co.)=100/4) for the EPDM primer.

As the sealer applicable in the present invention, for example, a urethane type sealer can be used preferably but other conventional sealers could also be used.

The third embodiment weather strip.

Figure 4:
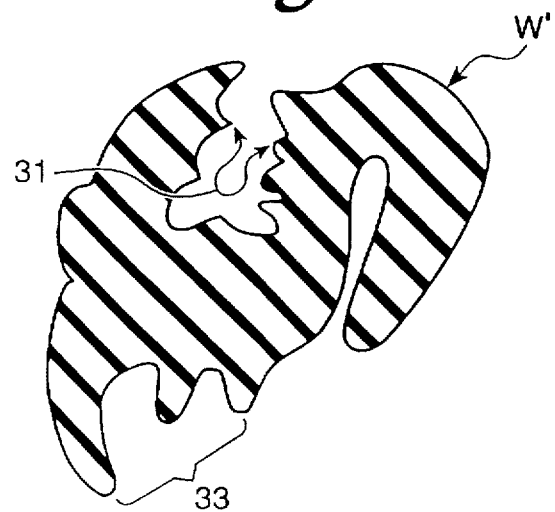
FIG. 4 is a cross-sectional view illustrating a third embodiment of a window frame weather strip.

Turning to FIG. 4, another embodiment of a weather strip is shown, that is, a window frame weather stripping W', for use with automobiles according to the present invention. This weather stripping is formed with a sulfur-vulcanizable EPDM compound and also has a portion designed to be in contact with a sealer upon mounting to an automobile. Such a portion can be the bottom and sides of glass holding groove 31, as well as portions of seal lip portion 33.

The EPDM in this embodiment is the same as that described previously.

Usually, the polymer is blended with auxiliary materials such as reinforcing fillers, for example, carbon black or white carbon, as well as plasticizers, lubricants and vulcanization chemicals.

In the embodiment described above, a compound of specific blend polymers as described below is used as the EPDM type compound.

The blend polymers has a blending ratio:

| EPDM type polymer | 40–98% (preferably: 70–90%) |
| NBR type polymer | 2–60% (preferably: 5–20%) |
| SBR type polymer | 0–30% (preferably: 5–20%) |

If the EPDM type polymer is less than 40%, it is difficult to ensure ozone resistance of the main body rubber, whereas if it exceeds 98%, it is difficult to ensure bondability between the main body rubber and the sealer.

Further, if the NBR type polymer is less than 2%, it is difficult to ensure the bondability between the main body rubber and the sealer, whereas if it exceeds 60%, it is difficult to ensure the ozone resistance of the main body rubber and ensure the vulcanization bondability between the main body rubber and the main body.

The SBR type polymer has an effect of enhancing the immiscibility or compatibility of the NBR type polymer with the EPDM type polymer, because it is assumed that the SBR type polymer has an intermediate polarity between the EPDM type polymer and the NBR type polymer. If the SBR type polymer exceeds 30%, it tends to reduce the vulcanization property of the main body rubber. For attaining the effect of improving the immiscibility, it is preferred that more than 5% of the SBR type polymer is blended.

The NBR type polymer may be a general-purpose unsaturated nitrile-conjugated diene copolymer rubber but the use of an unsaturated nitrile-conjugated diene-acrylic acid ester ternary copolymer rubber is preferred.

As the unsaturated nitrile, nitrites identical with those described previously can be used. The monomer composition of them may also be identical.

The SBR type polymer may be a general-purpose styrene-conjugated diene copolymer (SBR), and a hydrogenation product thereof is preferred for increasing the bondability to the sealer and the bondability to a primer.

The hydrogenation rate is usually from 90 to 100% and preferably, 95 to 100%.

The polymer composition of the conjugated diene rubber before hydrogenation comprises 10 to 40% (preferably 20 to 30% of styrene content and 60 to 90% (preferably 70 to 80%) of conjugated diene content. As the conjugated diene, those in the NBR type rubber described above can be used.

Assuming the styrene polymer as A, the styrene-butadiene random copolymer or butadiene copolymer having a number of vinyl bonds as B and the butadiene polymer having a number of cis-1.4 bonds as C, the conjugated diene rubber includes the types of AB, ABA, ABC, and ABA being particularly preferred.

As noted previously, the blended polymer is usually blended with auxiliary materials such as reinforcing fillers, including but not limited to carbon black or white carbon, plasticizers, lubricants, vulcanization chemicals and, optionally, colorant, which are kneaded in a general-purpose kneader, such as, for example, rolls or a Banbury mixer, to forma rubber blend for a weather strip according to the present invention.

Then, a window frame weather strip is extruded by an extruder and then vulcanized. Vulcanization is carried out, for example, in a microwave heating device and a hot blow vulcanization device. Vulcanization is undertaken usually at a temperature 200° C. for a period varying from 3 to 10 minutes.

Figure 5:
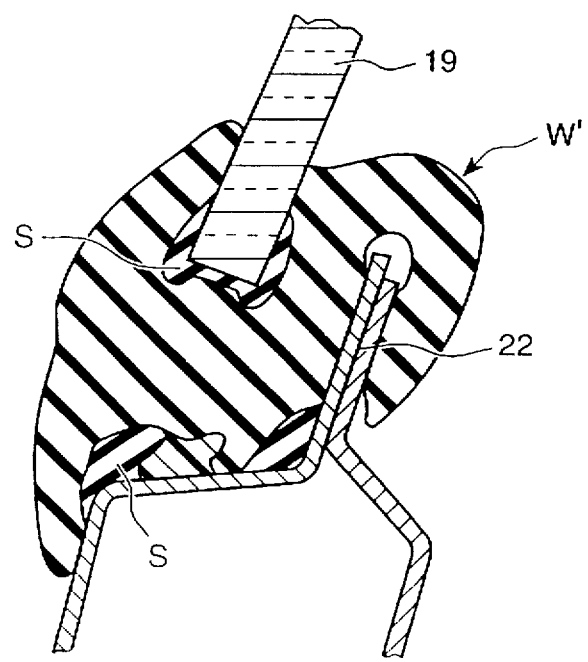
FIG. 5 is a cross-sectional view of the weather strip of FIG. 4 mounted to an automobile.

The thus manufactured window frame weather strip W is mounted to an automobile as shown in FIG. 5 by disposing sealer S to those portions intended to be in contact with the sealer. That is, along he bottom and lower sides of glass holding grooves 31 and within the seal lip portion 33. In the drawing, reference numeral 22 represents an automobile body flange and 19 represents a window shield glass.

In this case, since the main body rubber is formed with a specific EPDM type compound having good bondability with the sealer, a sufficient bonding strength can be expected with respect to the sealer S and a practical bonding strength (1.5 kgf/10 mm) can be obtained with no pretreatment such as buffing fabrication, degreasing or primer coating, as usual.

Further, primer coating is applied, a greater bonding strength can be obtained between the main body rubber and the sealer, particularly, when precoating an EPDM primer prior to the coating of the general-purpose primer (socyanate type primer in a case of urethane type sealer), a maximum bonding strength of 100% adherend destruction, that is sealer destruction, can be obtained.

There can be used preferably isocyanate type primer, for example, "90002T" (manufactured by Sunstar Giken Co.) as the general-purpose primer, and "K500" (manufactured by (Sumitomo Three M Co.), "SL8861" (manufactured by Sakai Kagaku Co.)/"DISMODULE RFE" (manufactured by Bayer Co.)=100/4 as the EPDM primer.

The sealer applicable in the present invention has no particular restriction and, for example, urethane type sealer such as "CS1450" (manufactured by Cemedine Co.) can be preferably used.

EXAMPLES

Each of the examples conducted for confirming the effect of the present invention will be explained below.

I. Examples of the First and Second Embodiments of the Present Invention

A: By using a cross head type extruder (specification: cylinder diameter of 60 mm φ and compression ration at 1.5), and using a rubber material for a window frame weather strip formed from a blending formulation shown in Table 1, and a rubber material for a sealer underlying layer of each of blending formulations comprising blend polymers at a blending ratio shown in Table 3, 4 in the blending formulation in Table 2, respectively, dual layer extrusion products of 10 mm width and 3 mm total thickness (each 1.5 mm thickness) were extruded at an extrusion rate at 5 mm/min and then treated with hot blowing vulcanization at 220° C. for a period of 5 minutes. The extrusion products were then cut into 100 mm lengths to prepare test specimens. In Comparative Examples 8, 9 mono layer extrusion products of a total 3 mm thickness were extruded using the rubber blend shown in Table 1 to prepare similar test specimens.

Tests for the following items were conducted for each of the test specimens:

(1) Tensile strength test: according to JIS K 6301;

(2) Bondability for main body/sealer underlying layer: 180° peeling test was conducted at a tensile speed of 50 mm/min; and (3) Bondability to sealer.

After forming a sealer layer with an urethane sealer ("CS1450" manufactured by Cemedine Co.) to 5 mm film thickness with or without coating a primer ("9002T" manufactured by Sunstar Giken Co.) with the sealer underlying side being upside, the sealer was cured by drying at 50° C. at 93% RH for five days. Then a 180° peeling test was conducted in the same manner as described above at a tensile speed of 50 mm/min.

B: Result of Test

From Tables 3, 4 showing the test results, it can be seen that each of the examples shows satisfactory characteristics in the tensile strength. That is, a practical bonding strength more than 1.5 kgf/10 mm is obtained without primer coating (refer to Examples 1, 3). Further, as shown in Example 5, it can be seen that a maximum bonding strength of 100% adherend sealer destruction can be obtained where coating the EPDM primer occurred before coating of the sealer primer.

The bondability for the main body/sealer underlying layer is poor in any of Comparative Examples 1, 2 using SBR instead of hydrogenated SBR and Comparative Examples 6, 7 with an excessive blending ratio of SBR. Further, it can be seen that in comparative Examples 4, 5 combining only the modified NBR or only the hydrogenated SBR with the EPDM results in satisfactory bondability between the main body/sealer underlying layer, but they scarcely have sealer bondability respectively. Further, comparative Examples 8, 9 using existent non-blend type general-purpose EPDM are poor in the sealer bondability compared with any of the examples, irrespective of roughening fabrication.

C: The dual layer extrusion was conducted to prepare test specimens in the same manner as described above by using the rubber material for the window frame weather strip of slightly forming formulation shown in Table 5 and the rubber material for the sealer layer 5 for each of blending formulations in Examples 1, 3, respectively.

Then, for each of the specimens, bondability for main body/sealer underlying layer was tested in the same manner as described above. As a result of the test, a sufficient bondability was obtained between the main body and the sealer underlying layer as 5.4 kgf/10 mm for micro-cell foam main body/Example 1 and as 5.8 kgf/10 mm for micro-cell foam main body/Example 2, respectively.

II. Example for Third Invention

A: By using an extruder with a cylinder diameter of 60 mmφ, and a compression ratio at 1.5, and by using rubber materials of each of blending formulations, using blend polymers, shown in Tables 7–9 in the basic blending formulation shown in FIG. 6, extrusion products of 10 mm width and 3 mm thickness were extruded at an extruding rate of 5 m/min. The extrusions were then treated with hot blow vulcanization conditions at a temperature of 220° C. for 15 minutes. The extrusion products were cut into 100 mm lengths to prepare test specimens. Further, test specimens were also prepared in the same manner by using blended rubbers shown in Table 10 in Comparative Examples 13, 14. Tests for the following items were conducted for each of the test specimens:

(1) Tensile strength test: according to JIS K 6301; and (2) Sealer bondability test.

After forming a sealer layer at a thickness of 5 mm with a urethane sealer ("CS1450" manufactured by Cemedine Co.), with or without coating a primer (primer "9002T" manufactured by Sunstar Giken Co.) or, in addition, with an EPDM primer ("K500" manufactured by Sumitomo Three M Co.), the sealer was cured by drying under conditions of 50° C. at 93% RH for 5 days. Then a 180° peeling test was conducted for each test specimen at a tensile speed of 50 mm/min.

(3) Ozone resistant test:

An ozone resistant test was conducted according to JIS K 6301. The test conditions were ozone concentration: 50 ppm, test temperature: 40° C., elongated: 50%, observation time: 300 hrs.

B: Test Results

It can be seen from Table 7, showing the results of the test, that each of the examples show satisfactory characteristics in tensile strength, sealer bondability, and ozone resistance. It can be seen that use of the unsaturated nitrile-conjugated diene-acrylic ester ternary copolymer (modified NBR) as NBR is particularly excellent in the sealer bondability in a state with no primer compared with general-purpose NBR (referred to Examples 9, 11) and use of the hydrogenated SBR as SBR increases the sealer bondability (refer to Examples 12, 18). Further, if the EPDM primer is coated prior to primer coating, it can be seen that maximum strength of 100% adherend (sealer) destruction can be obtained (Examples 13).

Further, it can be seen that Comparative Examples 10, 11, with no blending of NBR, scarcely show the sealer bondability irrespective of application of the primer coating. Comparative Example 12, with an excess SBR blending ratio, is poor in vulcanized rubber strength, and Comparative Example 13, with an excess blending ratio of NBR, is poor in ozone resistance. Further, Comparative Examples 15, 16, using existent non-blended type EPDM and with the primer coating, are poor in sealer bondability as compared with in each of the primer coated examples, even if roughening is used in fabrication of the product, as well as without such roughening.

(*1)–(*6) in Tables 3, 4 and 7–9 are, respectively, as shown below.

(*1) "JSR EP65": EPDM manufactured by Japan Synthetic Rubber Co., Ltd.: ethylene content 60%, third ingredient ethylidene norbornene, iodine value 29.0.

(*2) "JSR N250S": General-purpose NBR manufactured by Japan Synthetic Rubber co., Ltd.: acrylonitrile content 20%.

(*3) "JSR N250S": Acrylonitrile-butadiene-n-butyl acrylate manufactured by Japan Synthetic Rubber co., Ltd.: acrylonitrile content 25%, n-butyl acrylate content 40%.

(*4) "JSR DINARON 1320P": Hydrogenated SBR manufactured by Japan Synthetic Rubber Co., Ltd.: styrene content 10%, hydrogenation rate 99%.

(*5) "JSR 1502": General-purpose SBR manufactured by Japan Synthetic Rubber Co., Ltd.: styrene content 23.5%.

(*6) EPDM primer is coated prior to coating of the general-purpose primer.

TABLE 1

|  | (unit: wt %) |
| --- | --- |
| EPDM type polymer (JSREF 57C*) | 100 |
| MAF carbon black | 130 |
| Process oil (paraffinic) | 100 |
| Zinc powder | 5 |
| Stearic acid | 1 |
| Dehydrating agent (CaO) | 5 |
| Vulcanization promotor | 3.5 |
| Sulfur | 2 |

*Manufactured by Japan Synthetic Rubber Co., Ltd.

TABLE 2

|  | (unit: wt %) |
| --- | --- |
| Blend polymer (EPDM/NBR/SBR) | 100 |
| MAF carbon black | 75 |
| Zinc powder | 5 |
| Stearic acid | 1 |
| Dioctyl phthalate | 18 |
| Paraffinic process oil | 7 |
| Dehydrating agent (CaO) | 5 |
| Vulcanization promotor | 2.5 |
| Sulfur | 1.5 |

TABLE 3

| | Examples | | | | | | | |
| --- | --- | --- | --- | --- | --- | --- | --- | --- |
| | 1 | 2 | 3 | 4 | 5 | 6 | 7 | 8 |
| Blend | | | | | | | | |
| EPDM *1 | 80 | 80 | 80 | 80 | 80 | 60 | 60 | 96 |
| NBR *2 | 10 | 10 | — | — | — | — | — | — |
| Modified MBR *3 | — | — | 10 | 10 | 10 | 10 | 30 | 2 |
| Hydrogenated SBR *4 | 10 | 10 | 10 | 10 | 10 | 30 | 10 | 2 |
| SBR *5 | — | — | — | — | — | — | — | — |
| Pretreatment to bonding (primer coating) | none | applied | none | applied | (*6) | applied | applied | applied |
| Test Result | | | | | | | | |
| Tensile strength (MPa) | 10.5 | — | 10.2 | 10.2 | 10.2 | 7.5 | 9.5 | 11.0 |
| Bondability: Main body/sealer underlying layer (kgf/10 mm) | 5.6 | — | 6.0 | 6.0 | 6.0 | 5.6 | 5.4 | 4.6 |
| Bondability to sealer (kgf/10 mm) | 1.5 | 5.5 | 1.8 | 5.6 | 6.2 | 4.9 | 5.4 | 3.1 |
| State of Destruction | Mixed sealer-boundary | Mixed sealer-boundary | Mixed sealer-boundary | Mixed sealer-boundary | sealer destroyed | Mixed sealer-boundary | Mixed sealer-boundary | Mixed sealer-boundary |

TABLE 4

| | Comparative Examples | | | | | | | | |
| --- | --- | --- | --- | --- | --- | --- | --- | --- | --- |
| | 1 | 2 | 3 | 4 | 5 | 6 | 7 | 8 | 9 |
| Blend | | | | | | | | | |
| EPDM *1 | 80 | 80 | 90 | 90 | 90 | 50 | 50 | EPDM$^{Blend}$ (Table 1) | |
| NBR *2 | — | — | — | — | — | — | — | | |
| Modified MBR *3 | 10 | 10 | 10 | 10 | — | 40 | 10 | | |
| Hydrogenated SBR *4 | — | — | — | — | 10 | 10 | 40 | | |
| SBR *5 | 10 | 10 | — | — | — | — | — | | |
| Pretreatment to bonding (primer coating) | none | applied | none | applied | applied | applied | none | applied (no roughening) | applied (no roughening) |
| Test Result | | | | | | | | | |

TABLE 4-continued

|  | Comparative Examples | | | | | | | | |
|---|---|---|---|---|---|---|---|---|---|
|  | 1 | 2 | 3 | 4 | 5 | 6 | 7 | 8 | 9 |
| Tensile strength (MPa) | 10.4 | 10.4 | 10.4 | 10.4 | 10.3 | 9.4 | 6.5 | 12.0 | 12.0 |
| Bondability: Main body/sealer underlying layer (kgf/10 mm) | 1.0 | 1.0 | 1.0 | 1.0 | 5.5 | 0.8 | 1.2 | — | — |
| Bondability to sealer (kgf/10 mm) | 1.5 | 5.0 | 0.2 | 5.0 | 0.5 | 5.3 | 5.5 | 0.4 | 2.0 |
| Destroyed portion | Mixed sealer-boundary | Mixed sealer-boundary | Sealer destroyed | Mixed sealer-boundary | Mixed sealer-boundary | Mixed sealer-boundary | Mixed sealer-boundary | Sealer destroyed | Mixed sealer-boundary |

TABLE 5

| | (unit: pbw) |
|---|---|
| EPDM type polymer (E502*) | 100 |
| MAF carbon black | 140 |
| Process oil (paraffinic) | 60 |
| Zinc powder | 5 |
| Stearic acid | 1 |
| Dehydrating agent (CaO) | 5 |
| Polyethylene | 15 |
| Vulcanization promotor | 3.5 |
| Sulfur | 1.5 |
| Heat expansible capsule | 6 |

*Manufactured by Sumitomo Chemical Co., Ltd.

TABLE 6

| | (unit: parts) |
|---|---|
| Blend polymer (EPDM/NBR/SBR) | 100 |
| MAF carbon black | 75 |
| Zinc powder | 5 |
| Stearic acid | 1 |
| Dioctyl phthalate | 18 |
| Paraffinic process oil | 7 |
| Dehydrating agent (CaO) | 5 |
| Vulcanization promotor | 2.5 |
| Sulfur | 1.5 |

TABLE 7

|  | Examples | | | | | | | |
|---|---|---|---|---|---|---|---|---|
|  | 9 | 10 | 11 | 12 | 13 | 14 | 15 | 16 |
| Blend | | | | | | | | |
| EPDM *1 | 80 | 80 | 80 | 80 | 80 | 60 | 60 | 96 |
| NBR *2 | 10 | 10 | — | — | — | — | — | — |
| Modified MBR *3 | — | — | 10 | 10 | 10 | 10 | 30 | 2 |
| Hydrogenated SBR *4 | — | 10 | 10 | 10 | 10 | 30 | 10 | 2 |
| SBR *5 | — | — | — | — | — | — | — | — |
| Pretreatment to bonding (primer coating) | none | applied | none | applied | *6) | applied | applied | applied |
| Test Result | | | | | | | | |
| Tensile strength (MPa) | 10.5 | 10.5 | 10.2 | 10.2 | 10.2 | 7.5 | 9.5 | 11.0 |
| Bondability to sealer (kgf/10 mm) | 1.5 | 5.5 | 1.8 | 5.6 | 6.2 | 4.9 | 5.4 | 3.1 |
| Destroyed portion | Mixed sealer-boundary | Mixed sealer-boundary | Mixed sealer-boundary | Mixed sealer-boundary | sealer destroyed | Mixed sealer-boundary | Mixed sealer-boundary | Mixed sealer boundary |
| Ozone resistance | no crack | no crack | no crack | no crack | no crack | no crack | no crack | no crack |

TABLE 8

| | Examples | | | | | | |
|---|---|---|---|---|---|---|---|
| | 17 | 18 | 19 | 20 | 21 | 22 | 23 |
| Blend | | | | | | | |
| EPDM *1 | 80 | 90 | 90 | 98 | 60 | 50 | 40 |
| NBR *2 | — | — | — | — | — | — | — |
| Modified MBR *3 | 10 | 10 | 10 | 2 | 40 | 40 | 60 |
| Hydrogenated SBR *4 | — | — | — | — | — | 10 | — |
| SBR *5 | 10 | — | — | — | — | — | — |
| Pretreatment to bonding (primer coating) | applied | none | applied | applied | applied | applied | applied |
| Test Result | | | | | | | |
| Tensile strength (MPa) | 10.4 | 10.4 | 10.4 | 11.3 | 10.0 | 9.4 | 9.0 |
| Bondability to sealer (kgf/10 mm) | 5.0 | 1.7 | 5.0 | 3.0 | 5.5 | 5.3 | 5.7 |
| State of Destruction | Mixed sealer-boundary | Mixed sealer-boundary | Mixed sealer-boundary | Mixed sealer-boundary | sealer destroyed | Mixed sealer-boundary | Mixed sealer-boundary |
| Ozone resistance | no crack | no crack | no crack | no crack | no crack | no crack | no crack |

TABLE 9

| | Comparative Examples | | | | | | |
|---|---|---|---|---|---|---|---|
| | 10 | 11 | 12 | 13 | 14 | 15 | 16 |
| Blend | | | | | | | |
| EPDM *1 | 90 | 90 | 50 | 30 | | EPDM$^{Blend}$ | |
| NBR *2 | — | — | — | — | | (Table 5) | |
| Modified MBR *3 | — | — | 10 | 70 | | | |
| Hydrogenated SBR *4 | 10 | 10 | 40 | — | | | |
| SBR *5 | — | — | — | — | | | |
| Pretreatment to bonding (primer coating) | none | applied | applied | applied | none | applied (no roughening) | applied (with roughening) |
| Test Result | | | | | | | |
| Tensile strength (MPa) | 10.3 | 10.3 | 6.5 | 9.9 | 10.0 | 12.0 | 12.0 |
| Bondability to sealer (kgf/10 mm) | 0.2 | 0.5 | 5.5 | 5.8 | 0.2 | 0.4 | 2.0 |
| Destroyed portion | Sealer destroyed | Sealer destroyed | Mixed sealer-boundary | Mixed sealer-boundary | sealer destroyed | Mixed sealer-boundary | Mixed sealer-boundary |
| Ozone resistance | no crack | no crack | no crack | no crack | no crack | no crack | no crack |

TABLE 10

| | (unit: pbw) |
|---|---|
| EPDM (JSREP 57C*) | 100 |
| MAF carbon black | 130 |
| Process oil (paraffinic) | 100 |
| Zinc powder | 5 |
| Stearic acid | 1 |
| Dehydrating agent (CaO) | 5 |
| Vulcanization promotor | 3.5 |
| Sulfur | 2 |

*Manufactured by Japan Synthetic Rubber Co., Ltd.

What is claimed is:

1. An extruded automobile weather strip comprising an extruded main body comprising sulfur-vulcanizable ethylene propylene terpolymer rubber compound and a coextruded portion thereon for contacting a sealer when the weather strip is mounted to an automobile, said coextruded portion comprising a sealer underlying layer comprising a blended polymer compound for improving bondability, said blended polymer compound comprising 70–90 wt % of 5–20 wt % of an unsaturated nitrile-conjugated diene-acrylicester terpolymer, and 5–20 wt % of a hydrogenated styrene-conjugateddien copolymer, the hydrogenation ratio thereof being from 90 to 100%.

2. An automobile weather strip according to claim 1, wherein the hydrogenation ratio of the hydrogenated SBR type polymer is form 95 to 100%.

3. An automobile weather strip according to claim 1 or 2 wherein a primer layer is interposed between the sealer underlying layer and the sealer.

4. An extruded automobile weather strip comprising an extruded main body comprising a sulfur-vulcanizable microcell foam rubber and a coextruded portion secured thereto for contacting a sealer when the weather strip is mounted to an automobile, said coextruded portion comprising a sealer underlying layer comprised of a blended polymer compound for improving bondability, said blended polymer compound comprising 70–90 wt % of ethylene-propylene-diene terpolymer, 5–20 wt % of an unsaturated nitrile-conjugateddiene-acrylicester terpolymer, and 5–20 wt % of a hydrogenated styrene-conjugated diene copolymer, the hydrogenation ratio thereof being 90 to 100%.

5. An automobile weather strip according to claim 4, wherein the hydrogenation ratio of the hydrogenated styrene-conjugated diene copolymer is from 95 to 100%.

6. An automobile weather strip according to claim 4 or 5 further including a primer layer interposed between the sealer underlying layer and the sealer.

7. An automobile weather strip according to claims 4 or 5, wherein the micro-cell foam ethylene-propylene-diene terpolymer rubber compound is prepared by dispersing in the blend heat expansible microcapsules containing a low boiling hydrocarbon which expand at vulcanization temperatures.

8. An automobile weather strip according to claims 6, wherein the micro-cell foam ethylene-propylene-diene terpolymer rubber compound is prepared by dispersing in the blend heat expansible microcapsules containing a low boiling hydrocarbon which expand at vulcanization temperatures.

* * * * *